United States Patent
McNew et al.

(10) Patent No.: US 7,412,248 B2
(45) Date of Patent: Aug. 12, 2008

(54) SYSTEM AND METHOD FOR LOCATION DETERMINATION

(75) Inventors: Justin Paul McNew, Del Mar, CA (US); Robert Charles Blakely, Anaheim, CA (US); Jun Liu, San Diego, CA (US); Khaled I. Dessouky, Studio City, CA (US)

(73) Assignee: Technocom Corporation, Encino, CA (US)

( * ) Notice: Subject to any disclaimer, the term of this patent is extended or adjusted under 35 U.S.C. 154(b) by 0 days.

(21) Appl. No.: 11/020,752

(22) Filed: Dec. 22, 2004

(65) Prior Publication Data

US 2005/0288033 A1  Dec. 29, 2005

Related U.S. Application Data

(60) Provisional application No. 60/579,931, filed on Jun. 15, 2004.

(51) Int. Cl.
*H04Q 7/20* (2006.01)
*H04B 7/00* (2006.01)
*H04M 11/04* (2006.01)

(52) U.S. Cl. .............. 455/456.1; 455/456.5; 455/456.6; 455/517; 455/404.2

(58) Field of Classification Search .............. 455/456.1, 455/456.5, 456.6, 404.2, 517, 550.1, 553.1
See application file for complete search history.

(56) References Cited

U.S. PATENT DOCUMENTS 6,445,927 B1 * 9/2002 King et al. ............... 455/456.6
6,768,909 B1 * 7/2004 Irvin ........................ 455/456.1
6,865,395 B2 * 3/2005 Riley ........................ 455/456.1
2002/0115448 A1 * 8/2002 Amerga et al. .............. 455/456

(Continued)

OTHER PUBLICATIONS 3G 3rd Generation Partnership Project 2 "3GPP2", "Position Determination Service Standard for Dual Mode Spread Spectrum Systems—Addendum";3Gpp2.C.S0022-0-1; Feb. 16, 2001; 72pp.

(Continued)

*Primary Examiner*—George Eng
*Assistant Examiner*—Un C. Cho
(74) *Attorney, Agent, or Firm*—Christie, Parker & Hale, LLP.

(57) ABSTRACT

In one embodiment, a system and method for determining a location of a mobile device are described. A number of different locations for the mobile device is provided using a location determining system. The locations for a number of virtual base stations are determined utilizing the known locations for the mobile device. Then a new location for the mobile device is established based on the determined plurality of locations of the virtual base stations. In one embodiment, a system and method for establishing network references for a first wireless location determining system are described. A plurality of known locations for a mobile device is provided using a second location determining system. Radio signals between the mobile device and base stations of the first wireless location determining system are measured and a plurality of locations for a respective plurality of virtual base stations are determined based on the known locations of the mobile device and the measured radio signals. The determined plurality of locations for the plurality of virtual base stations are then utilized to establish network references for the first wireless location determining system.

20 Claims, 11 Drawing Sheets

U.S. PATENT DOCUMENTS

| | | | |
|---|---|---|---|
| 2004/0127223 A1* | 7/2004 | Li et al. | 455/446 |
| 2005/0064878 A1* | 3/2005 | O'Meagher | 455/456.1 |
| 2005/0113117 A1* | 5/2005 | Bolin et al. | 455/456.6 |
| 2005/0267677 A1* | 12/2005 | Poykko et al. | 701/207 |

OTHER PUBLICATIONS

3rd Generation Partnership Project; Technical Specification Group Radio Access Network; Stage 2 Functional Specification of Location Services in UTRAN; (3G TS 25.305 version 2.0.0); Dec. 1999; 38 pp.

Song, Han-Lee; "Automatic Vehicle Location in Cellular Communications Systems"; IEEE Transactions on Vehicular Technology; vol. 43; No. 4; Nov. 1994; pp. 902-908.

Spingarn, Karl; "Passive Position Location Estimation Using the Extended Kalman Filter"; IEEE Transactions on Aerospace and Electronic Systems; vol. AES-23; No. 4; Jul. 1987; pp. 558-567.

Zhao, Yilin; "Vehicle Location and Navigation Systems: Intelligent Transportation Systems"; Artech House, 1997; pp. 221-224.

* cited by examiner

FIGURE 1

PRIOR ART

SYSTEM AND METHOD FOR LOCATION DETERMINATION

CROSS-REFERENCE TO RELATED APPLICATION

This Patent Application claims the benefit of the filing date of U.S. Provisional Patent Application Ser. No. 60/579,931, filed Jun. 15, 2004 and entitled "System and Method for Location Determination without Network References," the entire content of which is hereby expressly incorporated by reference.

FIELD OF THE INVENTION

The present invention generally relates to the field of wireless systems and more particularly, to a system and related method for determining location of a mobile device and providing network references for a wireless location determination system.

BACKGROUND OF THE INVENTION

Wireless location determination techniques can use base stations or devices emitting radio signals to a mobile terminal to determine its position. Signals can also be emitted from the mobile terminal (device) to the base station. To locate a mobile terminal, these techniques require known network references such as base station locations and measurement calibration values. The locations of base stations in a wireless network are usually known to a certain extent, e.g., within an error of a hundred meters. However, such a level of accuracy would produce significant errors when used in location determination of a mobile terminal. Thus, the accurate location of the reference point needs to be determined and verified for reliable location determination purposes.

Radio Frequency (RF) characteristics of transmitters and receivers also vary over time due to environmental changes. This introduces systematic biases and errors into radio measurements. These biases/errors also need to be removed from the radio measurements for reliable location determination purposes.

Typically, the network references need to be determined and characterized prior to location determination of the mobile terminal. To fix reference point locations, test engineers are sent to the field to conduct surveys by using other independent location techniques such as Global Positioning System (GPS). To compensate for time-varying biases/errors in radio measurements, test engineers also perform a repeat calibration procedure to determine these calibration values and in turn, subtract their effects from subsequent position calculations. In the description of this invention, "system biases" and "calibration values" for a base station are interchangeable terms. Field surveys and repeat calibrations significantly increase engineering complexity and operational costs, especially for large-scale wireless networks.

For scenarios in which a mobile terminal is capable of performing radio measurements, the key information on the network references, including base station locations and measurement calibration values, may be unavailable or inaccurate. This greatly diminishes the ability to determine the position of the mobile terminal. Therefore, there is a need for a system and related method that remove the constraints of known network references for mobile location determination.

SUMMARY OF THE INVENTION

In one embodiment, the present invention is a system and method for determining a location of a mobile device. A plurality of different locations for the mobile device using a location determining system are provided and a plurality of locations for a respective plurality of virtual base stations utilizing the plurality of provided locations for the mobile device are determined A new location for the mobile device based on the plurality of determined locations of the virtual base stations is then determined.

In one embodiment, the present invention is a mobile device, which includes: a reference module for providing locations of the mobile device utilizing a location determining system; a radio measurement module for communicating with a wireless network and taking measurements of radio signals between the mobile device and a plurality of base stations at different locations of the mobile device; a memory for saving the provided locations of the mobile device and the corresponding radio measurements; and a computing engine for determining locations of a plurality of virtual base stations based on the saved locations of the mobile device and the corresponding radio measurements and computing a new location of the mobile device based on the plurality of determined locations of the virtual base stations.

In one embodiment, the present invention is a method and system for establishing network references for a first wireless location determining system having a plurality of base stations. A plurality of different locations for a mobile device using a second wireless location determining system are provided and radio signals between the mobile device and the plurality of base stations of the first wireless location determining system are measured. A plurality of locations for a respective plurality of virtual base stations based on the provided locations of the mobile device and the measured radio signals are determined and utilizing the plurality of determined locations of the plurality of virtual base stations, the network references for the first wireless location determining system are determined.

The location determining system may be Global Positioning System, Iridium, Galileo, and the like. The different locations for the virtual base stations and the mobile device are determined in a wireless location determining system utilizing one or more of the following techniques received signal strength (RSS), angle of arrival (AOA), time of arrival (TOA), time difference of arrival (TDOA), and the like.

BRIEF DESCRIPTION OF THE DRAWINGS

The objects, advantages and features of this invention will become more apparent from a consideration of the following detailed description and the drawings, in which.

DETAILED DESCRIPTION

In one embodiment, the system and method of present invention determine a location of a mobile device without using network references typically required by a wireless location determining system. First, the invention uses a number of known locations for the mobile device provided by an external location determining system, and radio measurements between the mobile device and base stations in a wireless network. The locations and system biases for a number of virtual base stations are then determined utilizing the known locations for the mobile device and the corresponding radio measurements. A new location for the mobile device is then computed based on the plurality of determined virtual base stations and the current radio measurements in the wireless location determining system without using network references.

The system and method of the present invention thus remove the requirement of accurately determining reference point locations and RF calibration values for location determination, hence field surveys and repeat calibrations by test engineers are not required, resulting in lower engineering complexity and system maintenance. The embodiments of the invention may be realized in a mobile terminal, a wireless network, or the like.

Wireless Location techniques described in 3GPP2 C.S0022-0-1, *Position Determination Service Standard for Dual Mode Spread Spectrum Systems—Addendum*, Feb. 16, 2001 (formerly IS-801) [1]; and 3GPP TS25.305, *Stage 2 functional specification of user equipment (UE) positioning in UTRAN* (release 1999), v3.8.0, March 2002 [2], the entire contents of which are hereby expressly incorporated by reference, are classified as received signal strength (RSS) positioning, angle of arrival (AOA) positioning, time of arrival (TOA) positioning, and time difference of arrival (TDOA) positioning, and combinations thereof. First, all these methods depend on certain measurements of emitted and received radio signals to determine the location of a mobile terminal. Second, the measurements generally need to be calibrated to compensate for systematic biases/errors. For example, unsynchronized base stations would result in timing measurement errors and phase drifts in base stations would result in angle measurement errors. Finally, the location information of the network reference points must be known in order to calculate the position of the mobile terminal. In other words, known network reference points in addition to properly calibrated radio measurements lead to determining the accurate position of a mobile terminal.

Figure 1:
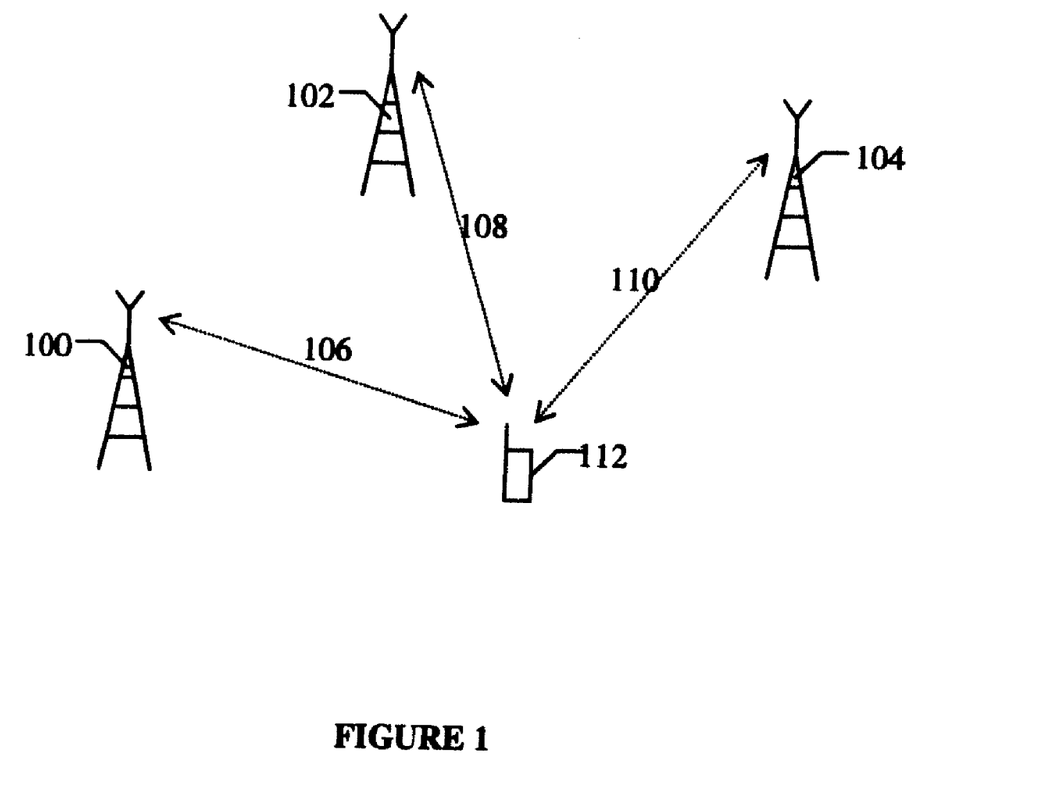
FIG. 1 is an illustration of locating a mobile terminal by a typical wireless technique.

FIG. 1 illustrates a typical location determination system in a wireless network. The system includes base stations (or reference points) 100, 102, 104 with known locations and a mobile terminal 112 with an unknown location. Once the radio measurements 106, 108 and 110 between the base stations 100, 102, 104 and the mobile terminal 112 are performed and properly calibrated, the mobile position can be accurately determined from known locations of the base stations 100, 102, 104.

In the realization of location based services in a wireless network, the network elements typically involve one or more of the following generic devices: Mobile Switching Center, Mobile Position Gateway and Position Determination Device. The Mobile Switching Center is responsible for routing and managing the setup and teardown of voice circuits. The Mobile Position Gateway assists the Mobile Switching Center in determining how to route the call. The Position Determination Device is responsible for calculating the position of the mobile terminal.

Figure 2:
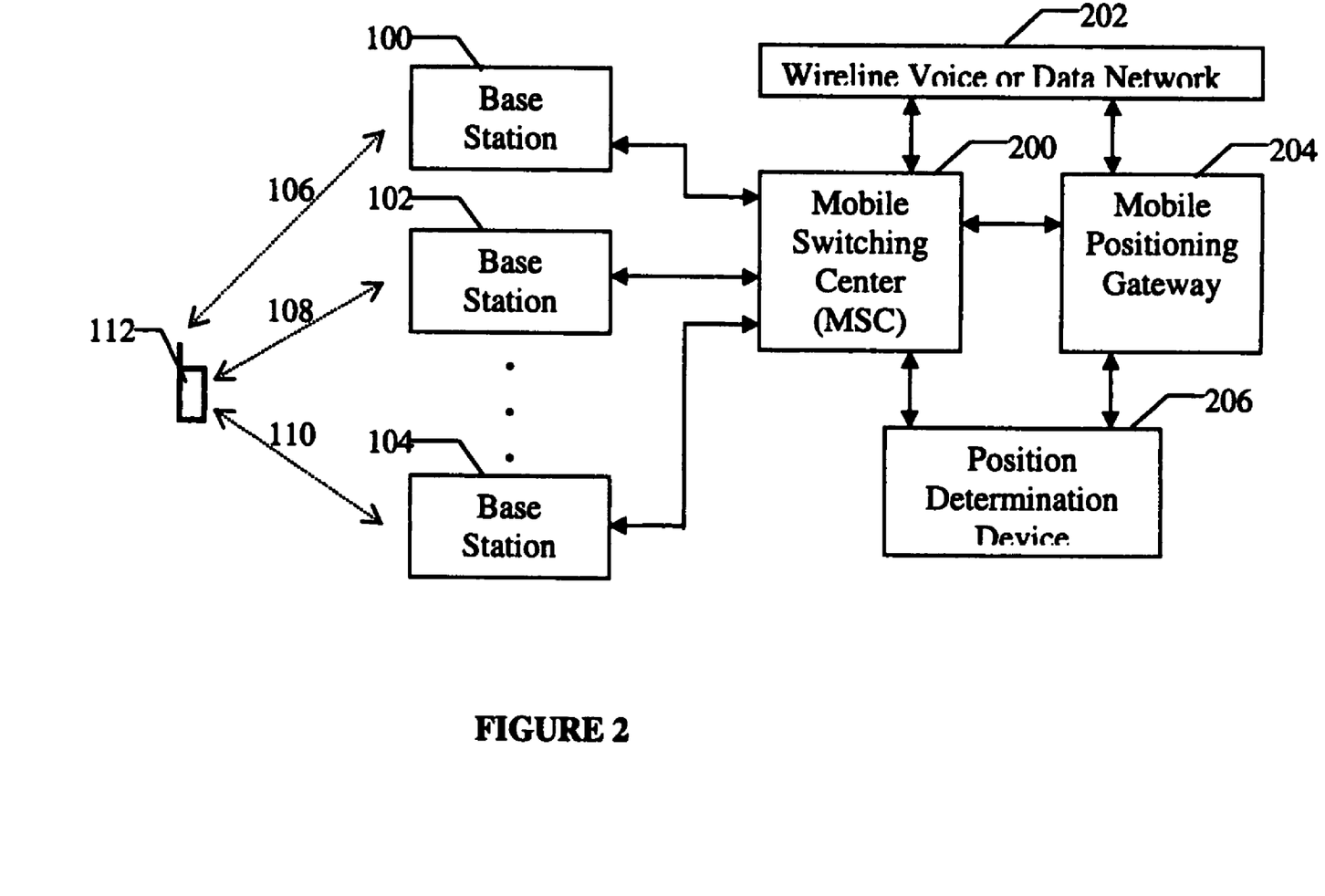
FIG. 2 is an exemplary architecture used to enable location services in a wireless network.

A typical architecture for a wireless network enabled with location capabilities is illustrated in FIG. 2, according to one embodiment of the present invention. The mobile terminal 112 or the base stations 100, 102 and 104 take measurements 106, 108 and 110 of radio signals between them respectively. The measurements are stored in a message format. The Mobile Switching Center (MSC) 200 is typically connected to the base stations (BS) directly or through a base station controller. The primary responsibility of the MSC 200 is routing calls to and from the wireline voice or data network 202. The Mobile Position Gateway 204 manages location information for mobile terminals, and provides an interface for external devices including the wireline network 202 to request position information. The Position Determination Device 206 is responsible for calculating the location of a mobile terminal, such as device 112, and communicating the position information to the Mobile Positioning Gateway 204 for management and distribution of the location information.

For example, in a Code Division Multiple Access (CDMA) network with location capability, a Mobile Positioning Center (MPC) and Position Determination Entity (PDE) act as Mobile Positioning Gateway and Position Determination Device, respectively (see, e.g. [1]). Forward Link Trilateration (FLT) approach has been standardized by the CDMA industry (see, e.g. [1]) for location determination. FLT is essentially a TDOA process performed at the mobile terminal, wherein the basic idea is to measure the time differences (phase delay) between received pilot signals (from CDMA base stations) and the local time reference. The information regarding network references such as base station locations (latitude, longitude and elevation), and time measurement calibration value for each CDMA pilot is stored in a Base Station Database (BSD), which is typically a part of a PDE.

Another example of location technology is a system that utilizes radio signals from broadcast networks. Broadcast towers serve as base stations; a mobile terminal is capable of measuring power or time information of radio signals from the broadcast towers. Traditionally, calibration is required to adjust timing measurement errors, while the locations of broadcast towers must be accurately known. As the power transmitted from broadcast towers is received at much higher levels than that from satellites, this location technology is intended to replace GPS for indoor and urban environments where GPS positioning often fails.

A location determination approach without network references assumes some form of an external location determining reference, for example, GPS, Iridium or Galileo, is available. The external location reference provides the position of a mobile terminal when available. In the meantime, the mobile terminal takes measurements of radio signals from base stations in a wireless network. When the external location determining reference fails to provide the mobile location, the radio measurements alone can not lead to the determination of the position of the mobile terminal without knowing the network references, e.g., the base station locations and their measurement calibration values. In one embodiment, the present invention provides a location determination method complementing an external location determining reference such as GPS, Iridium or Galileo in situations where the external location determining reference fails to operate, thus enhancing the overall location performance.

Known base station locations and radio measurements between the mobile terminal and base stations can lead to position determination of a mobile terminal as shown in FIG. 1. Conversely, known mobile positions and radio measurements at these locations can lead to location determination of the base stations. Due to physically uncalibrated measurement biases, the determined locations of the base stations may not be at their actual physical locations, but at estimated locations, so called virtual base stations.

Figure 3:
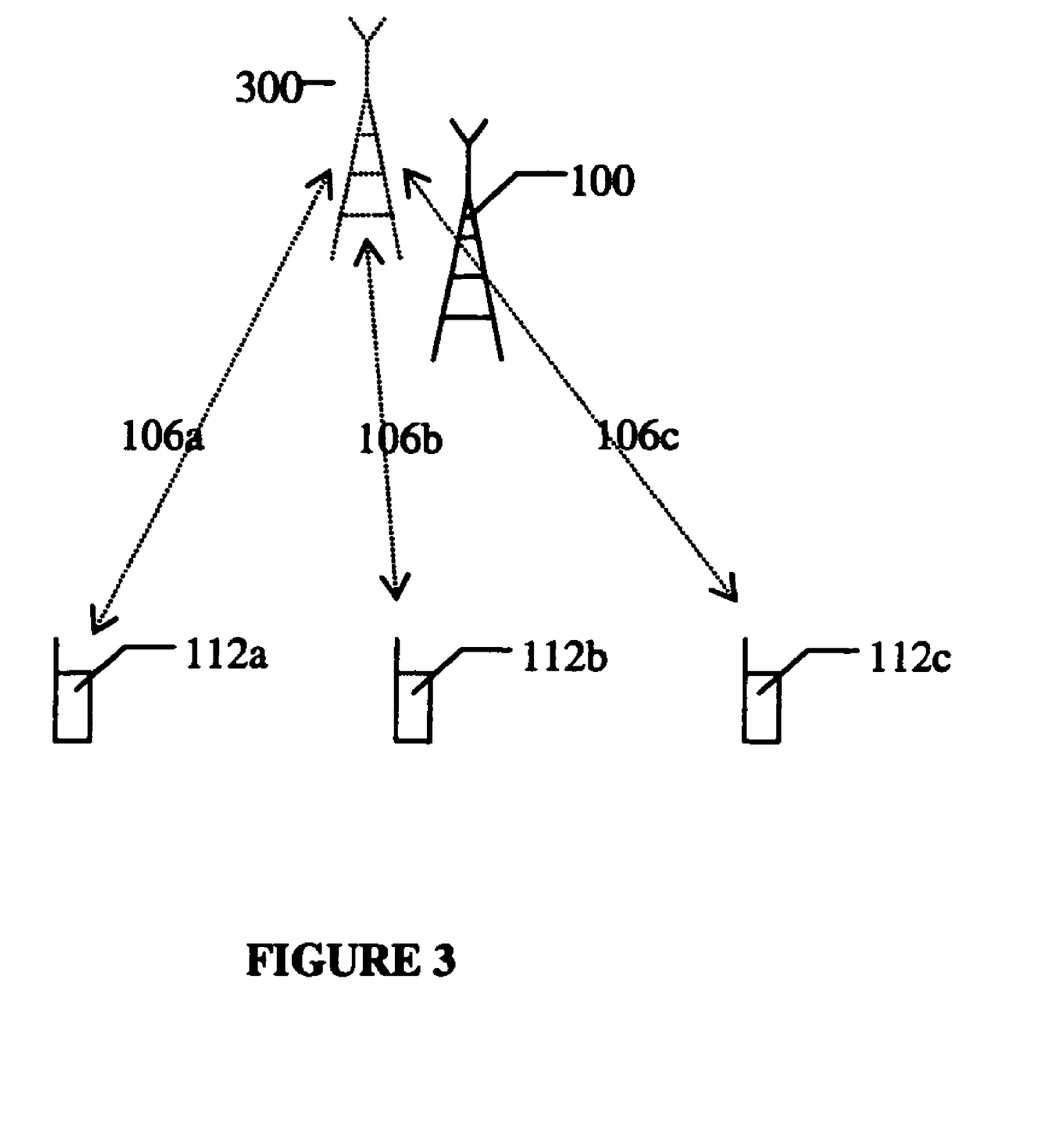
FIG. 3 is an exemplary illustration of determining virtual base station locations.

FIG. 3 shows an exemplary illustration of location determination of a virtual base station. Depicted dotted lines 106a, 106b and 106c represent radio measurements taken between the actual base station 100 and the mobile terminal at known locations 112a, 112b and 112c, respectively. Location 300 is the determined virtual base station. There are situations in which an external location determining reference (e.g., GPS) fails to provide mobile positions, for example, if the mobile terminal moves into GPS signal blockage areas such as in buildings or street canyons. In these situations, the virtual base station determined by the present invention plus current radio measurements, are utilized to determine the location of the terminal.

In summary, the invention provides the means to build the location information of virtual base stations on-the-fly (i.e., in real time), while an external location reference is providing mobile locations, and the means to continuously determine the mobile location through the virtual base stations, while the external reference is unable or unavailable to provide the mobile locations. An exemplary process is shown in the state machine of FIG. 4A, according to one embodiment of the present invention.

Figure 4A:
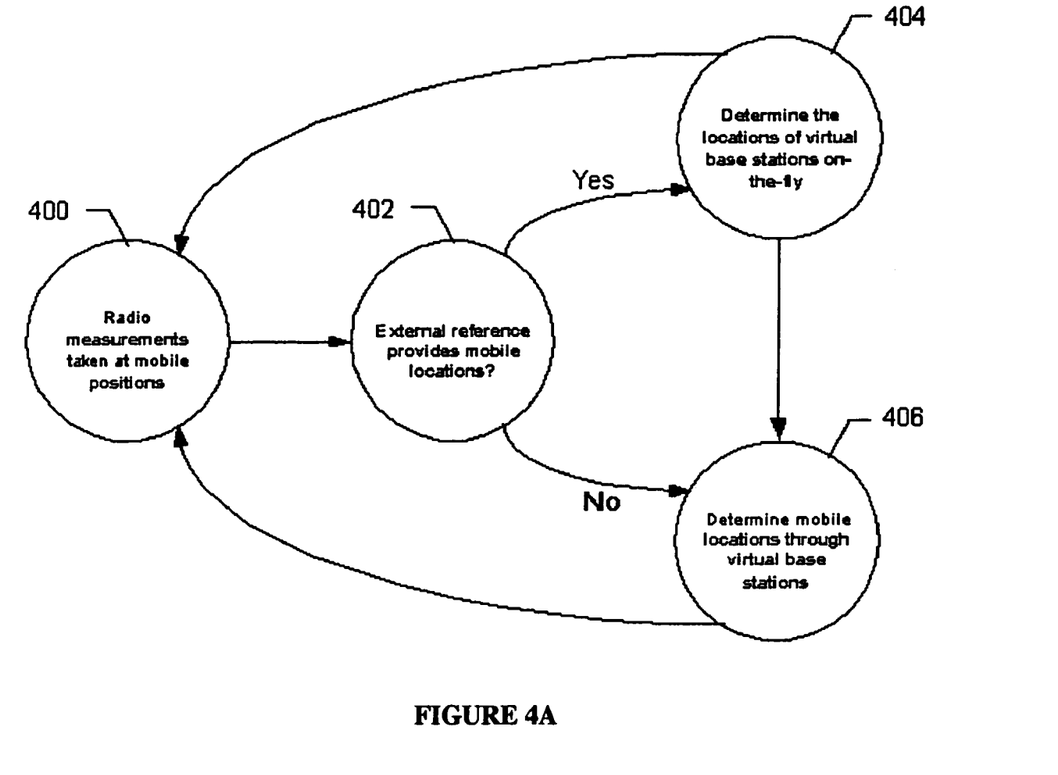
FIG. 4A is an exemplary state machine of mobile location determination without network references, according to one embodiment of the present invention.

Referring now to the state machine of FIG. 4A, in State 400, measurements of radio signals between the mobile terminal and base stations are taken by either the mobile terminal or the base stations in a wireless network. After radio measurements are taken, the current state changes to State 402. In State 402, a condition of whether the external reference provides mobile locations is verified. The current state changes to State 404, if the condition is true, or changes to State 406 if the condition is false.

In State 404, the locations and optionally, the system biases of the virtual base stations are determined on-the-fly by using the known mobile locations provided by the external reference in State 402 and the corresponding radio measurements taken in State 400. After the location determination is completed, the current state changes to State 400. The location information of virtual base stations is used in State 406 to determine location of the mobile terminal. In State 406, the mobile locations are determined by using the virtual base stations provided in State 404 and the corresponding radio measurements taken in State 400. After the location determination is completed, the current state changes to State 400.

Figure 4B:
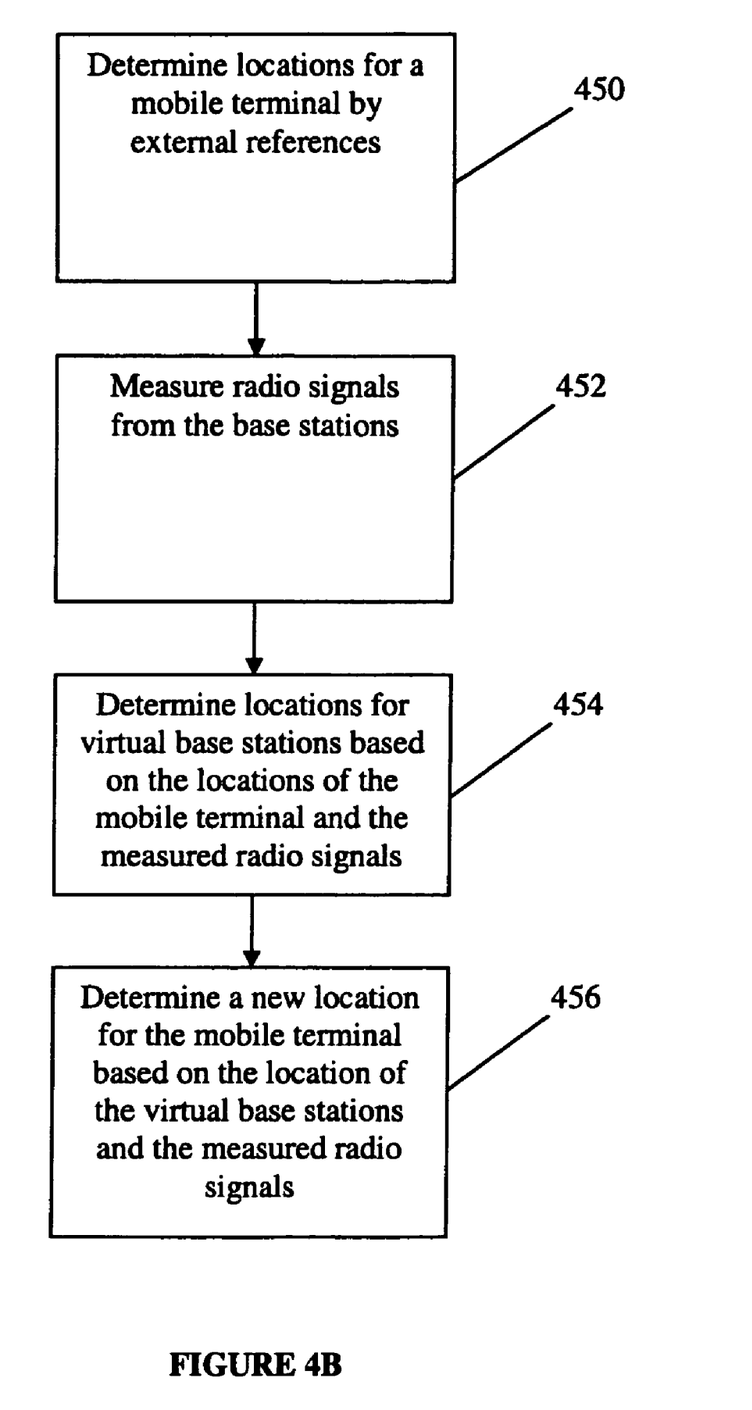
FIG. 4B is an exemplary process flow diagram, according to one embodiment of the present invention.

FIG. 4B illustrates an exemplary process flow diagram, according to one embodiment of the present invention. As shown in block 450, a number of locations are provided for the mobile terminal by the external reference. The radio signals between the mobile terminal and a number of base stations in the wireless network are measured by the mobile terminal or the respective base stations, as depicted in block 452. The locations and optionally, system biases of virtual base stations are determined based on the known locations for the mobile terminal and the measured radio signals, as shown in block 454. In block 456, a new location for the mobile terminal is determined based on the determined virtual base stations and the current measured radio signals, with using neither the external reference nor network references in the wireless network.

Figure 5:
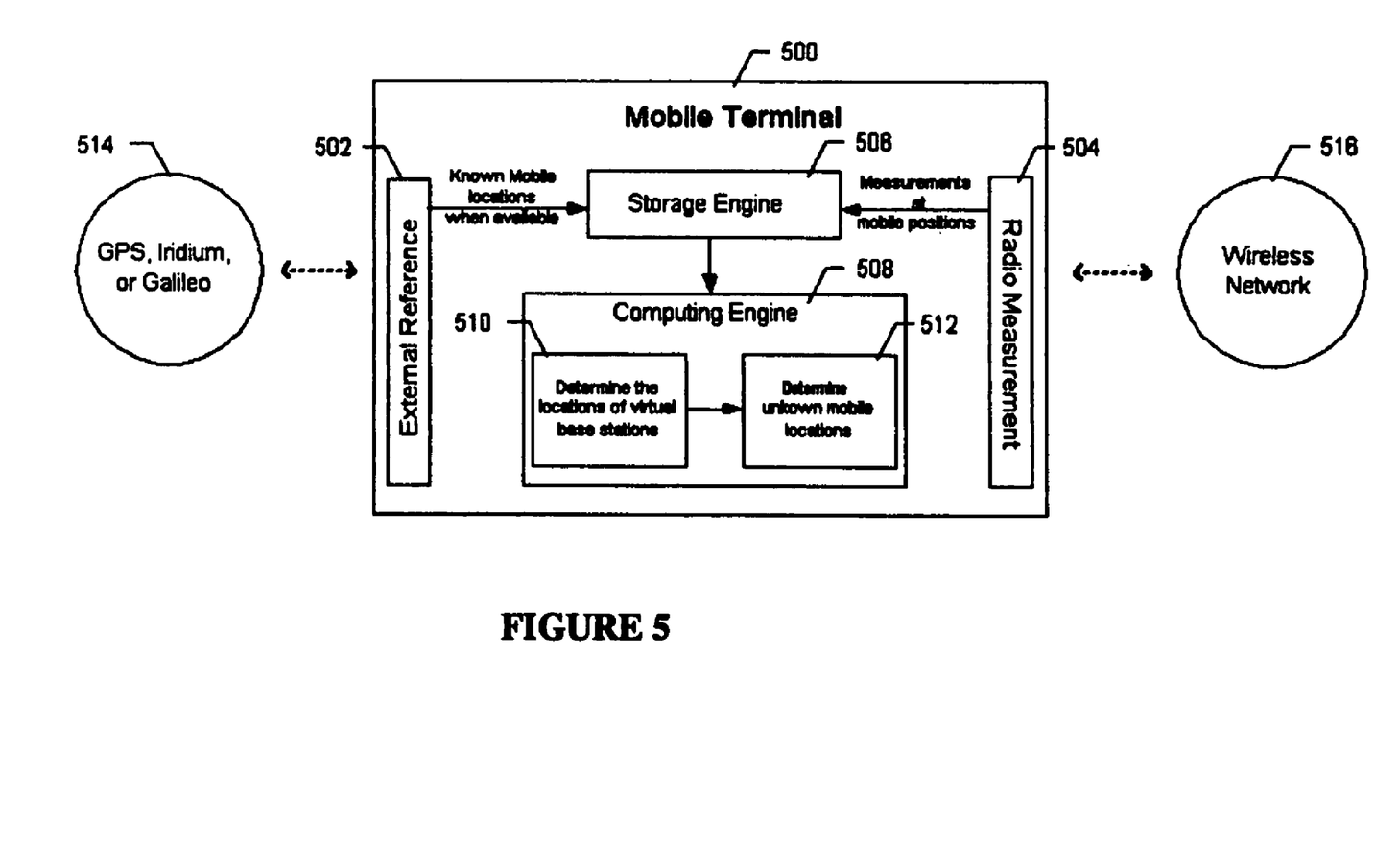
FIG. 5 is an exemplary system diagram for implementing a location determination method, according to one embodiment of the present invention.

FIG. 5 shows an exemplary system diagram of location determination without network references implemented in the mobile terminal, according to one embodiment of the present invention. The external reference module 502 communicates with an external network 514 such as GPS, Iridium or Galileo, and provides mobile locations when available. In the meantime, radio measurement module 504 communicates with a wireless network 516, and takes the measurements of radio signals between mobile terminal 500 and wireless network 516 at different positions of the mobile terminal. The known mobile terminal locations and the corresponding radio measurements are saved in storage engine 506, and passed to computing engine 508 to determine the locations and system biases of the virtual base stations by sub-module 510. When the external reference module 502 fails to provide mobile locations, the determined virtual base stations plus the current radio measurements are used in the computing engine 508 to compute the mobile location by sub-module 512.

The time difference between the external reference module 502 providing a mobile location and the radio measurement module 504 taking the radio measurements from the wireless network 516 should be as small as possible. The time discrepancy within thirty milliseconds is considered negligible because the mobile terminal 500 with a traveling speed of one hundred kilometers per hour can only move one meter in thirty milliseconds. The numbers of radio measurements required for determining a virtual base station and determining an unknown mobile location depend on the form of radio measurements. In the example implementation for TDOA described later on, a minimum of five measurements from a base station is necessary to solve for the 3-D location of the corresponding virtual base station, and a minimum of four measurements for the 2-D location of a virtual base station; a minimum of three measurements (each from one base station) is necessary to solve for the 3-D location of a mobile terminal, and a minimum of two measurements for the 2-D location of a mobile terminal.

Figure 6:
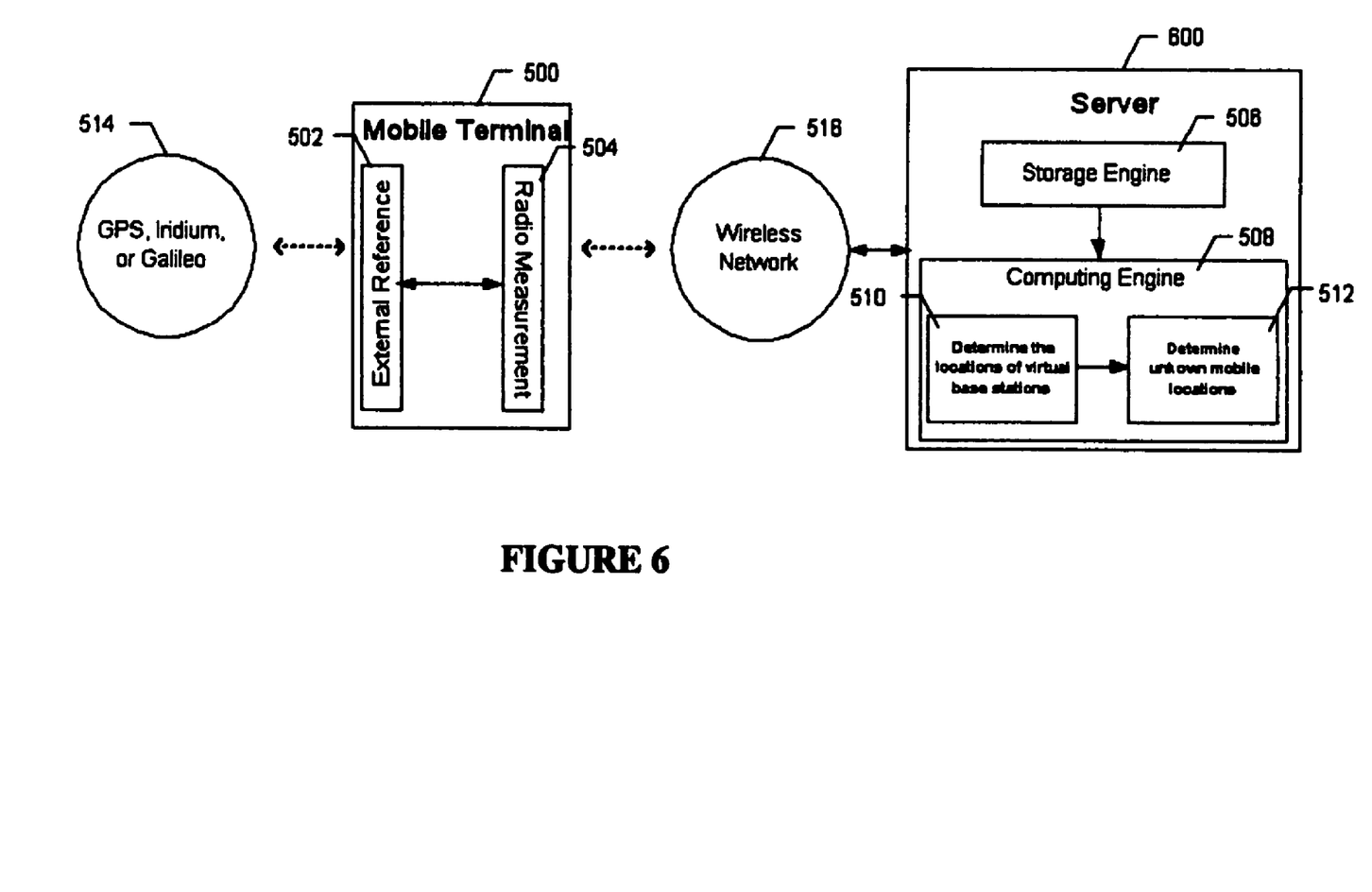
FIG. 6 is an exemplary system diagram for implementing a location determination method, according to one embodiment of the present invention.
Figure 7:
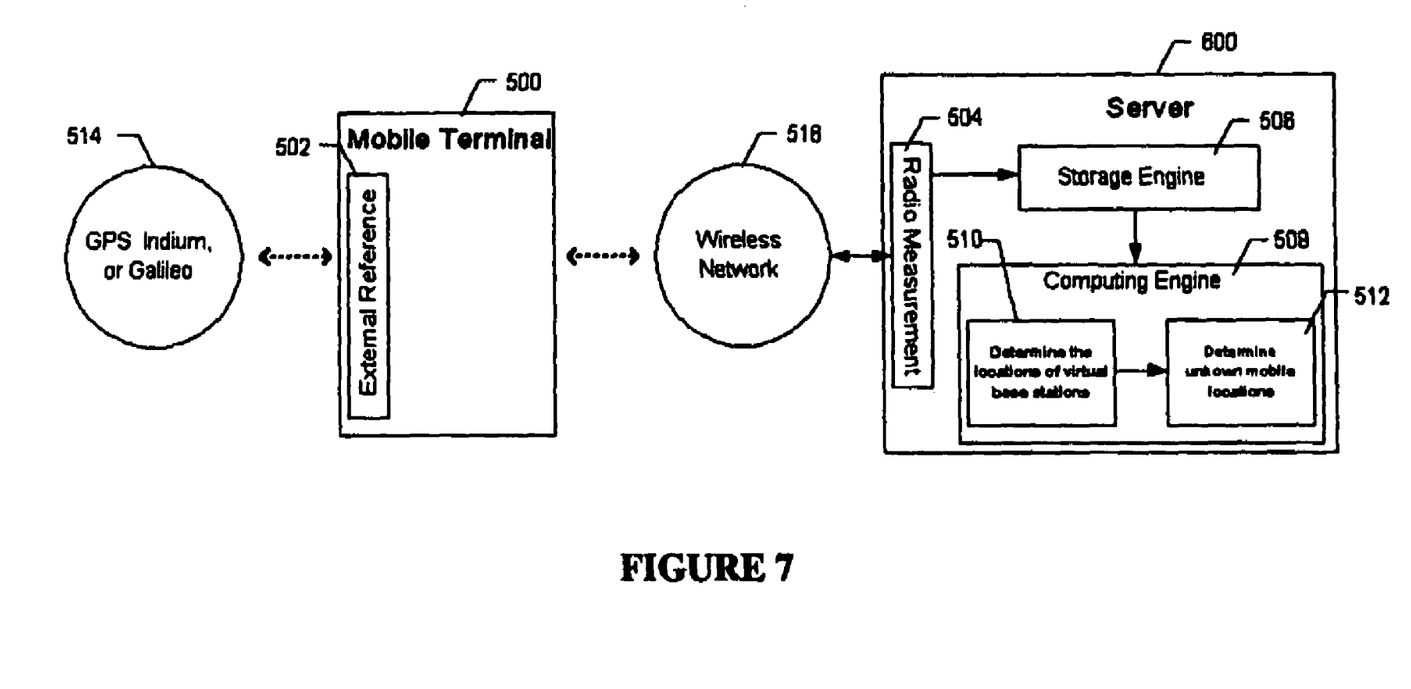
FIG. 7 is an exemplary system diagram for implementing a location determination method, according to one embodiment of the present invention.

FIG. 6 and FIG. 7 show two alternative embodiments of the present invention in a server in the wireless network. In the embodiment shown in FIG. 6, the radio measurement module is located in the mobile terminal 500. The radio measurements are taken by the mobile terminal 500 and transmitted to the server 600. In the embodiment shown in FIG. 7, the radio measurement module is located in the server 600. The radio measurements are taken by the server 600. In both embodiments, the storage engine 506 (for saving known mobile positions and radio measurements) and the computing engine 508 (for determining virtual base stations and unknown mobile positions) are located in the server 600.

In one embodiment, the calculated virtual base station information (including locations and system biases for base stations of a first wireless location determining system) is used as real network reference information for a second wireless location determining system. FIGS. 5, 6 and 7 also illustrate exemplary system diagrams of providing network references implemented in a mobile terminal or a server, respectively. For providing networking references, the submodule 512 in FIGS. 5, 6 and 7 is not necessary and may be removed.

Traditionally, field surveys and calibrations by test engineers are required for determining locations and system biases for each base station. According to the present invention, once the locations of virtual base stations are determined, the locations of actual base stations are not necessary. A calibrating the radio measurements is also not required, because measurement biases/errors can be estimated during the determination process of the virtual base station locations. When the present invention is used for location determination, field surveys and repeat calibrations are not required. When the present invention is used for providing/collecting network references for a second system, the workload of field surveys and repeat calibrations is reduced to a simple task of changing locations of a mobile terminal (such as the one depicted in FIGS. 5, 6 and 7) in service areas.

The method and system of the invention can be applied to any generic wireless network, for example, any cellular network such as CDMA (described in [1]), GSM and UMTS (described in [2]); or any broadcasting network such as, radio and television networks. Specifically, in the example of a CDMA network, when the present invention is used for location determination, the PDE and repeat calibrations of pilot phase measurements are not needed because the corresponding information is calculated on-the-fly. When the present invention is used for providing/collecting network references for a second system, the workload of updating the PDE (through field surveys of base station locations and repeat calibrations of pilot phase measurements) is reduced to a simple task of moving (e.g., deriving with) a mobile terminal (such as the one depicted in FIGS. 5, 6 and 7) in service areas resulting in lower system engineering complexity and operational cost.

Figure 8:
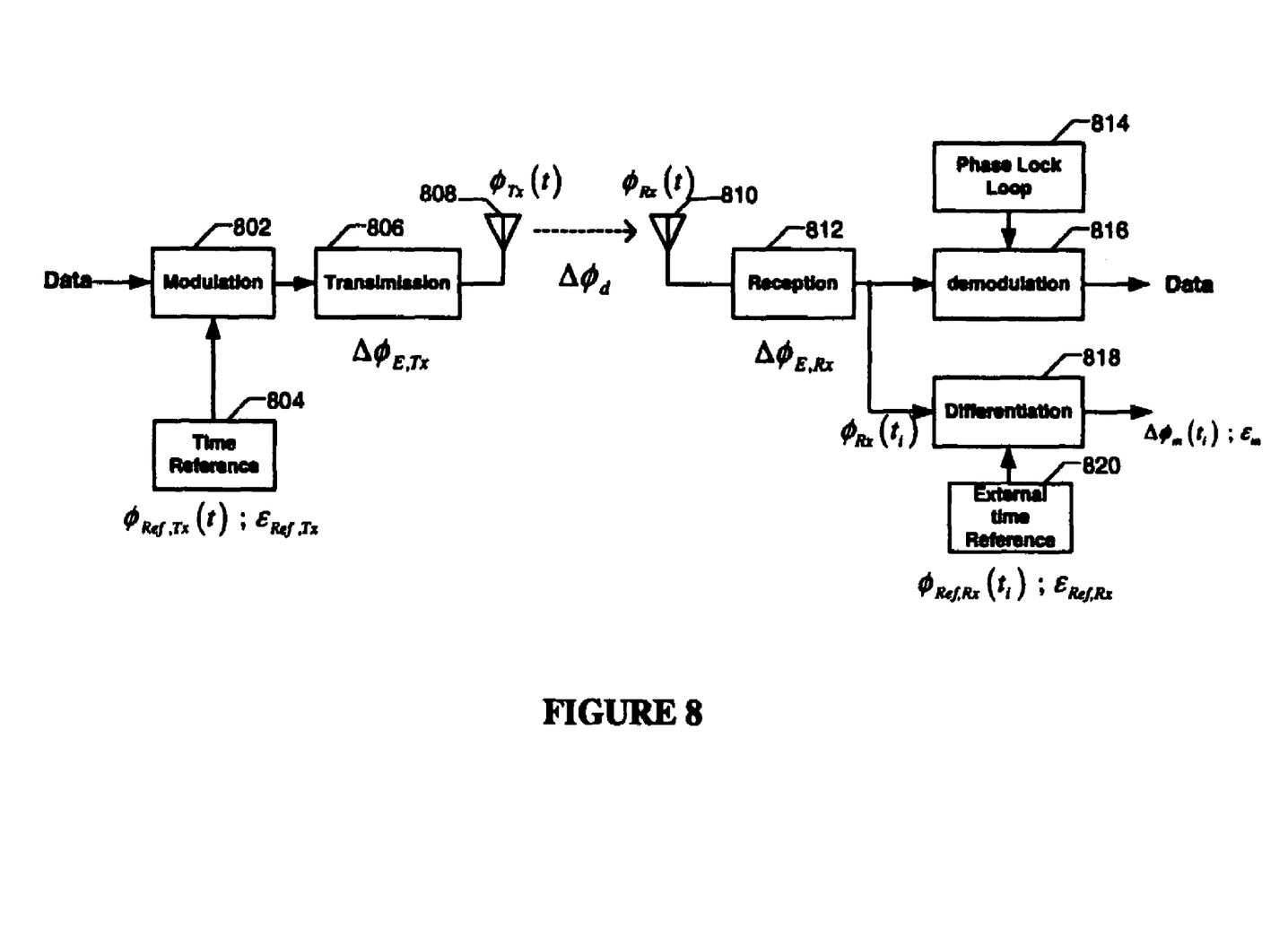
FIG. 8 is an exemplary illustration of transmission and reception of a wireless signal, according to one embodiment of the present invention.

Specific processing used by the computing engine 508 for computing a location depends on the form of radio measurements. An exemplary process to determine virtual base stations and then mobile locations based on TDOA measurements (in the form of phase differences), is described herein. FIG. 8 depicts an exemplary illustration from transmission of a wireless signal to its reception. On the transmission side, the data and the reference signal (from the time reference module 804) are input to the modulation module 802; the modulated signal is amplified by the transmission module 806 and then emitted out by the transmitter antenna 808. On the reception side, the signal is picked up by the receiver antenna 810 and amplified by the reception module 812; the received signal is converted to the original data by using the phase lock loop module 814 and the demodulation module 816. In the differentiation module 818, the phase difference measurements are taken by comparing the received signal with the reference signal (from the external time reference module 820 such as the GPS time). The relationship between time difference measurements and the coordinates of the transmitter and receiver, and systematic biases is derived as follows.

The phase difference between the received signal and the external reference signal (from the module 820) is $$\Delta\phi_m(t_i) = \phi_{Ref,Rx}(t_i) - \phi_{Rx}(t_i) + \epsilon_{Ref,Rx} + \epsilon_m \qquad \text{Eq. (1)}$$

where on the receiver side:

$\Delta\phi_m(t_i)$ is the measured phase difference at the receiver at epoch $t_i$.

$\phi_{Ref,Rx}(t_i)$ is the receiver reference phase at the measurement epoch.

$\phi_{Rx}(t_i)$ is the received signal phase at the measurement epoch.

$\epsilon_{Ref,Rx}$ is the error in the receiver reference.

$\epsilon_m$ is the actual measurement error.

And:

$$\phi_{Rx}(t_i) = \phi_{Ref,Tx}(t_i) - \Delta\phi_{E,Tx} - \Delta\phi_d(t_i) - \Delta\phi_{E,Rx} + \Delta_{Ref,Tx} \qquad \text{Eq. (2)}$$

where:

$\Delta\phi_{E,Tx}$ is constant error introduced by the transmitter equipment.

$\Delta\phi_d(t_i)$ is the delay introduced by the distance from transmitter to receiver.

$\Delta\phi_{E,Rx}$ is constant error introduced by the receiver equipment.

$\epsilon_{Ref,Tx}$ is the error in the transmitter reference.

Substituting Eq. (2) into Eq. (1), $$\Delta\phi_m(t_i) = \Delta\phi_d(t_i) + \phi_{Ref,Rx}(t_1) - \phi_{Ref,Tx}(t_i) + \Delta\phi_{E,Tx} + \Delta\phi_{E,Rx} + \epsilon_{Ref,Tx} + \epsilon_{Ref,Rx} + \epsilon_m \qquad \text{Eq. (3)}$$

In addition, $$\phi_{Ref,Tx}(t_i) = \phi_{0,Tx} + f_{Tx}(t_i - t_0); \quad \phi_{Ref,Rx}(t_i) = \phi_{0,Rx} + f_{Rx}(t_i - t_0)$$

where $t_0$ is the time base of the entire system.

$f_{Tx}$ is the clock frequency of the transmitter.

$\phi_{0,Tx}$ is the initial phase of the transmitter clock.

$f_{Rx}$ is the clock frequency of the receiver.

$\phi_{0,Rx}$ is the initial phase of the receiver clock.

Hence, $$\phi_{Ref,Rx}(t_i) - \phi_{Ref,Tx}(t_i) = (f_{Rx} - f_{Tx})\cdot(t_i - t_0) + \phi_{0,Rx} - \phi_{0,Tx} \qquad \text{Eq. (4)}$$

Substituting Eq. (4) into Eq. (3), $$\Delta\phi_m(t_i) = \Delta\phi_d(t_i) + a + b\cdot(t_i - t_0) + \epsilon \qquad \text{Eq. (5)}$$

where $a = \phi_{0,Rx} - \phi_{0,Tx} + \Delta\phi_{E,Tx} + \Delta\phi_{E,Rx}$, a fixed bias;

$b = (f_{Rx} - f_{Tx})$, a constant change rate of bias;

$\epsilon = \sqrt{\epsilon_{Ref,Tx}^2 + \epsilon_{Ref,Rx}^2 + \epsilon_m^2}$, the total random errors.

Also:

$$\Delta\phi_{d_i}(t_i) = \frac{f}{c}[(x_{Tx} - x_{Rx})^2 + (y_{Tx} - y_{Rx})^2 + (z_{Tx} - z_{Rx})^2]^{1/2} \qquad \text{Eq. (6)}$$

where:

$x_{Tx}$, $y_{Tx}$, $z_{Tx}$ are the transmitter's location coordinates at epoch $t_i$, $x_{Rx}$, $y_{Rx}$, $z_{Rx}$ are the receiver's location coordinates at epoch $t_i$, f is the frequency of the transmitted signal, and c is the speed of light.

From Eqs. (5) and (6), a phase difference measurement $\Delta\phi_m(t_i)$ is related to the coordinates ($x_{Tx}$, $y_{Tx}$, $z_{Tx}$ and $x_{Rx}$, $y_{Rx}$, $z_{Rx}$) of the transmitter and the receiver, and systematic biases (a, b):

$$\Delta\phi_m(t_i) = \frac{f}{c}[(x_{Tx} - x_{Rx})^2 + (y_{Tx} - y_{Rx})^2 + (z_{Tx} - z_{Rx})^2]^{1/2} + a + b\cdot(t_i - t_0) + \epsilon \qquad \text{Eq. (7)}$$

Figure 9:
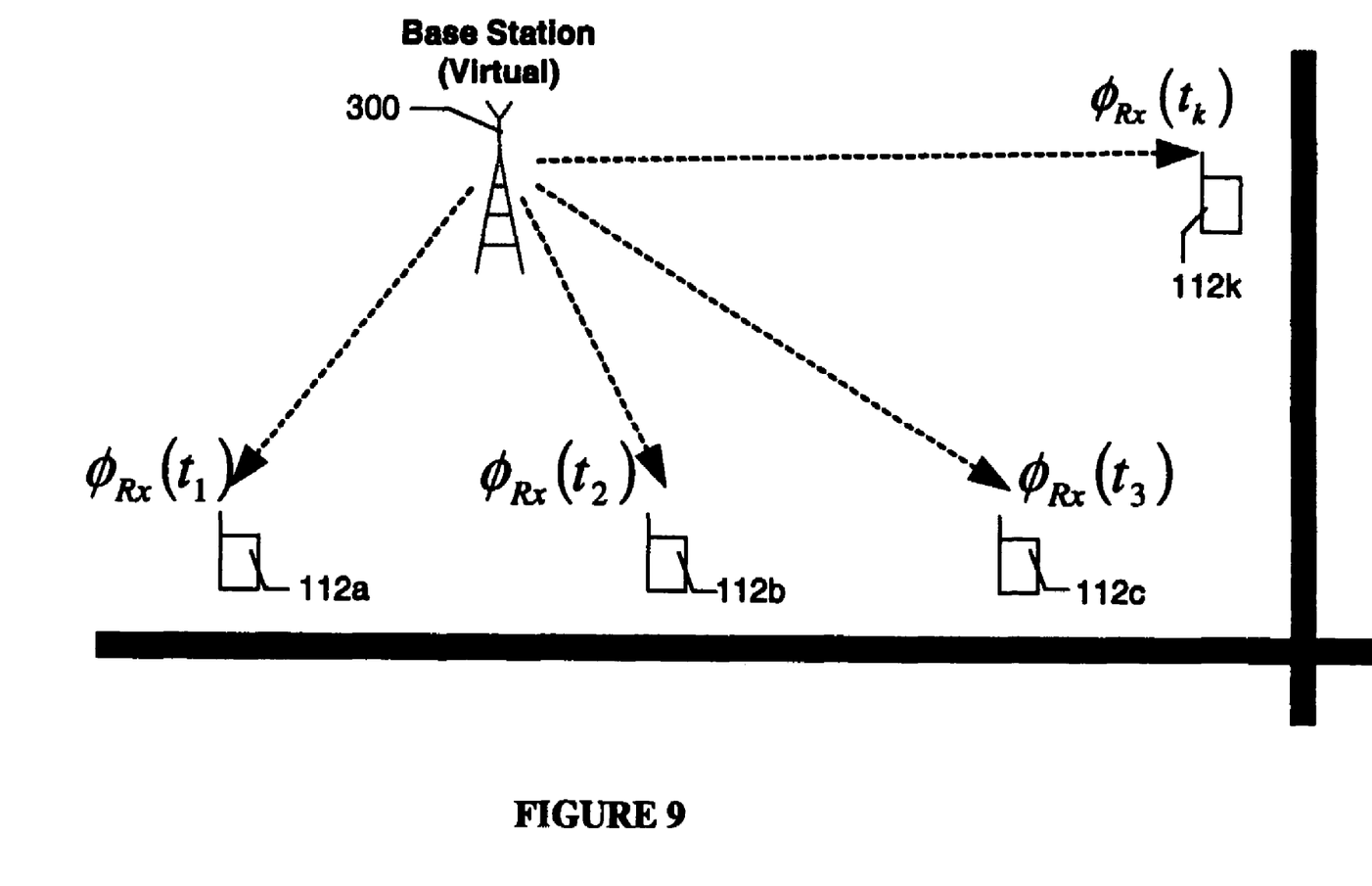
FIG. 9 is an exemplary geometry for virtual base station location determination, according to one embodiment of the present invention.

An exemplary process for determining virtual base station locations and calibration values is now described. FIG. 9 depicts an exemplary geometry of virtual base station location determination while mobile positions are provided by an external reference module such as GPS. As the mobile terminal 112 travels its route, relative phase measurements on a base station of opportunity are continuously received. For instance, $\Delta\phi_m(t_1)$, $\Delta\phi_m(t_2)$, $\Delta\phi_m(t_3)$, $\Delta\phi_m(t_k)$ at different mobile locations are received and processed to determine a virtual location for the base station 300 and the corresponding calibration values. In this case, the coordinates $x_{Rx}$, $y_{Rx}$, $z_{Rx}$ of the receiver (mobile terminal) at epoch $t_i$ are known. Regardless of the number of measurements $\Delta\phi_m(t_i)$ made, there are only five unknown parameters from Eq. (7): the coordinates $x_{Tx}$, $y_{Tx}$, $z_{Tx}$ of the transmitter (base station) and the system biases a, b. A minimum of five measurements is necessary to solve for a virtual location for the base station. Six measurements can allow overall location error of the virtual base station to be estimated. More measurements will reduce the error of the virtual location and make identification of gross measurement errors possible. If the frequency reference for both the transmitter and the receiver are the same (e.g. from the GPS time), then b=0 and there are only four unknowns.

Let the state vector be:

$$x(t)=[x_{Tx}, y_{Tx}, z_{Tx}, a, b],\qquad\text{Eq. (8)}$$

Since the base station is stationary, the state update equation is simply given by $$\tilde{x}(t_k/t_{k-1})=\tilde{x}(t_{k-1}/t_{k-1})\qquad\text{Eq. (9)}$$

where $\tilde{x}(t_{k-1}/t_{k-1})$ is the smoothed state estimate at $t_{k-1}$ given k−1 measurements, and $\tilde{x}(t_k/t_{k-1})$ is the predicted state estimate at $t_k$ given k−1 measurements.

The measurement update equation is $$\Delta\phi_m(t_k)=h(\tilde{x}(t_k))+\epsilon(t_k)\qquad\text{Eq. (10)}$$

which is defined by Eq. (7).

Based on Eqs. (9) and (10), the state vector of a virtual base station can be estimated by using an extended continuous-discrete Kalman filter described in Karl Spingarn, *Passive Position Location Estimation Using the Extended Kalman Filter*, IEEE Tans. on AES, July 1987 [3], the entire contents of which are hereby expressly incorporated by reference.

The Kalman filter update equations for virtual base station location are:

$$\tilde{x}_k(t_k)=\tilde{x}_{k-1}(t_k)+K_k[y_k-g_k]\qquad\text{Eq. (11)}$$

where $y_k$ is the measurement and $g_k$ is the projection of the measurement:

$$g_k=\sqrt{(x_{Tx}-x_m)^2+(y_{Tx}-y_m)^2+(z_{Tx}-z_m)^2}+a_{k-1}+b_{k-1}(t_k-t_0)\qquad\text{Eq. (12)}$$

$x_{Tx}$, $y_{Tx}$, $z_{Tx}$ is the current estimate of the base station position and $x_m$, $y_m$, $z_m$ is the current measured position by the external reference. The Kalman gain matrix is:

$$K_k=P_{k-1}(t_k)G_k^T[r_k+G_kP_{k-1}(t_k)G_k^T]^{-1}\qquad\text{Eq. (13)}$$

where the projected covariance matrix is:

$$P_{k-1}(t_k)=P_{k-1}(t_{k-1})+Q(t_k,t_{k-1})\qquad\text{Eq. (14)}$$

and:

$$G\equiv\left[\frac{\partial g}{\partial x}\ \frac{\partial g}{\partial y}\ \frac{\partial g}{\partial z}\ \frac{\partial g}{\partial a}\ \frac{\partial g}{\partial b}\right]\qquad\text{Eq. (15)}$$

and $r_k$ is the measurement ($y_k$) variance.

$Q(t_k, t_{k-1})$ is the covariance expansion from time $t_{k-1}$ to $t_k$, and finally, the updated covariance is:

$$P_k(t_k)=[1-K_kG_k]P_{k-1}(t_k)\qquad\text{Eq. (16)}$$

The filter is then extended to reduce the effects of nonlinearities through iteration about the reference vector $x_{R_k}(t_k)$ by replacing Eq. (11) with:

$$\tilde{x}_k(t_k)=x_{R_k}(t_k)+K_k[y_k-g_k+\{x_{R_k}(t_k)-\tilde{x}_{k-1}(t_k)\}]\qquad\text{Eq. (17)}$$

The iteration begins with $x_{R_k}(t_k)=\tilde{x}_{k-1}(t_k)$ and continues until the change between successive iterations is negligible.

In the existing location techniques and systems, the base station locations are normally acquired by a site survey campaign, and a repeat calibration campaign is required to determine the values of the system biases a, b. In the present invention, these network references (base station locations and calibration values) are determined on-the-fly while mobile locations are being provided by some external reference such as GPS.

An exemplary process for determining mobile terminal locations through virtual base stations is now described. While an external location determining reference provides mobile terminal locations, phase information from multiple base stations is processed to obtain virtual locations and system biases for each base station, as defined by Eqs. (8) through (17). When the external reference such as GPS is lost (due to poor satellite geometry and/or loss of satellite signal in natural or urban canyons), the mobile terminal location can be determined and tracked by using the information from the pre-determined network references (locations and system biases for base stations).

Figure 10:
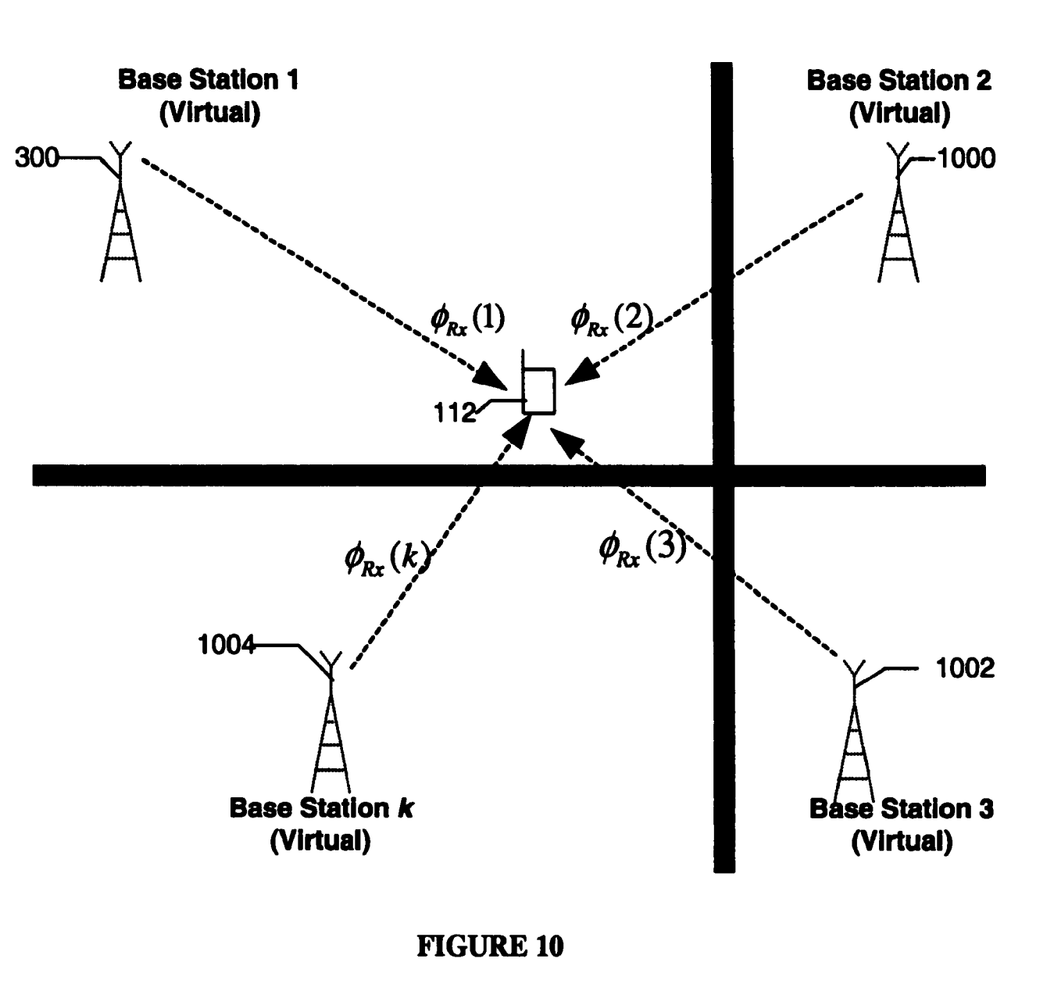
FIG. 10 is an exemplary geometry for mobile location determination, according to one embodiment of the present invention.

FIG. 10 shows an exemplary geometry involved in locating the mobile terminal through the virtual base stations. The mobile 112 takes phase measurements, for instance $\Delta\phi_m(1)$, $\Delta\phi_m(2)$, $\Delta\phi_m(3)$, $\Delta\phi_m(k)$ from different base stations 300, 1000, 1002 and 1004, respectively, at the same time. In this case, the coordinates $x_{Tx}$, $y_{Tx}$, $z_{Tx}$ and the system biases a, b of each virtual base station are known. Regardless of the number of measurements $\Delta\phi_m(k)$ made, there are only three unknown parameters from Eq. (7), that is, the coordinates $x_{Rx}$, $y_{Rx}$, $z_{Rx}$ of the receiver (mobile terminal). A minimum of three measurements (each from one virtual base station) is necessary to solve for the mobile location. Four measurements (from four virtual base stations) can allow overall location error of the mobile. More measurements will reduce the error of the location and make identification of gross measurement errors possible.

Let the state vector be:

$$\tilde{x}(t)=[x_{Rx}, y_{Rx}, z_{Rx}],\qquad\text{Eq. (18)}$$

The state update equation is given by $$\tilde{x}(k/k-1)=\tilde{x}(k-1/k-1)\qquad\text{Eq. (19)}$$

where $\tilde{x}(k-1/k-1)$ is the smoothed state estimate at Step k−1 given k−1 measurements, and $\tilde{x}(k/k-1)$ is the predicted state estimate at Step k given k−1 measurements.

The measurement update equation is $$\Delta \phi_m(k) = g(\tilde{x}(k)) + \epsilon(k) \qquad \text{Eq. (20)}$$

which is defined by Eq. (7).

Based on Eqs. (19) and (20), the state vector can be estimated by using the extended Kalman filter (described in [3]). Once the state vector is estimated, the location of the mobile device is determined without any need for network references.

The Kalman filter update equations for mobile location are:

$$\tilde{x}(t_k) = \tilde{x}_{k-1}(t_k) + K_k[y_k - g_k] \qquad \text{Eq. (21)}$$

where $y_k$ is the measurement vector and $g_k$ is the projection of the measurement vector:

$$g_k = \sqrt{(x_m - x_{Rx})^2 + (y_m - y_{Rx})^2 + (z_m - z_{Rx})^2} + a_m + b_m(t_k - t_0) \qquad \text{Eq. (22)}$$

$(x_{Rx}, y_{Rx}, z_{Rx})$ is the current estimate of the mobile position, $(x_m, y_m, z_m)$ is the location of a virtual base station and $(a_m, b_m)$ is the system bias of the virtual base station. The Kalman gain matrix is:

$$K_k = P_{k-1}(t_k) G_k^T [r_k + G_k P_{k-1}(t_k) G_k^T]^{-1} \qquad \text{Eq. (23)}$$

where the projected covariance matrix is:

$$P_{k-1}(t_k) = P_{k-1}(t_{k-1}) + Q(t_k, t_{k-1}) \qquad \text{Eq. (24)}$$

and:

$$G \equiv \left[ \frac{\partial g}{\partial x} \quad \frac{\partial g}{\partial y} \quad \frac{\partial g}{\partial z} \right] \qquad \text{Eq. (25)}$$

and $r_k$ is the measurement ($y_k$) variance.

$Q(t_k, t_{k-1})$ is the covariance expansion from time $t_{k-1}$ to $t_k$, and finally, the updated covariance is:

$$P_k(t_k) = [1 - K_k G_k] P_{k-1}(t_k) \qquad \text{Eq. (26)}$$

The filter is then extended to reduce the effects of nonlinearities through iteration about the reference vector $x_{R_k}(t_k)$ by replacing Eq. (21) with:

$$\tilde{x}_k(t_k) = x_{R_k}(t_k) + K_k[y_k - g_k + \{x_{R_k}(t_k) - \tilde{x}_{k-1}(t_k)\}] \qquad \text{Eq. (27)}$$

The iteration begins with $x_{R_k}(t_k) = \tilde{x}_{k-1}(t_k)$ and continues until the change between successive iterations is negligible.

If the time references on transmission and reception in FIG. 8 are known, the TDOA measurements become TOA measurements and the example implementation for TDOA is also applied to TOA.

AOA or RSS measurements can also be used for location determination. The AOA positioning technique is described in Yilin Zhao, *Vehicle Location and Navigation Systems*, Artech House, Inc., P222-224, 1997, the entire contents of which are hereby expressly incorporated by reference. The RSS positioning technique is described in Han-Lee Song, *Automatic Vehicle Location in Cellular Communications*, WEEE Trans. on Vehicular Technology, November 1994, the entire contents of which are hereby expressly incorporated by reference. At known mobile locations provided by an external reference, virtual base stations can be determined (as described above) by using AOA or RSS measurements, and these virtual base stations are then used to determine mobile locations (as described above) when the external reference fails to provide mobile locations.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for determining a location of a mobile device in a wireless network including a plurality of network references, the method comprising:
    providing a plurality of different locations for the mobile device using a location determining system external to the wireless network;
    determining a plurality of estimated locations for a respective plurality of virtual base stations utilizing the plurality of locations for the mobile device provided by the location determining system external to the wireless network and without using the network references; and
    determining a new location for the mobile device utilizing the plurality of determined estimated locations of the virtual base stations without utilizing the location determining system external to the wireless network and without using the network references.

2. The method of claim 1, wherein the location determining system is one or more of the group consisting of Global Positioning System, Iridium, and Galileo.

3. The method of claim 1, wherein the plurality of estimated locations for a respective plurality of virtual base stations are determined using time difference of arrival (TDOA) method.

4. The method of claim 1, further comprising determining a plurality of system biases for the respective plurality of virtual base stations.

5. A mobile device in a wireless network including a plurality of network references comprising:
    a reference module for providing locations of the mobile device utilizing a location determining system external to the wireless network;
    a radio measurement module for communicating with the wireless network and taking measurements of radio signals between the mobile device and a plurality of base stations at different locations of the mobile device;
    a memory for saving the locations of the mobile device and the corresponding radio measurements provided by the location determining system external to the wireless network; and
    a computing engine for determining estimated locations of a plurality of virtual base stations utilizing the saved locations of the mobile device and the corresponding radio measurements, without using the network references, and computing a new location of the mobile device based on the plurality of determined estimated locations of the virtual base stations without utilizing the location determining system external to the wireless network, and without using the network references.

6. The mobile device of claim 5, wherein the location determining system is one or more of the group consisting of Global Positioning System, Iridium, and Galileo.

7. The mobile device of claim 5, wherein the radio measurement module measures radio signals according to time difference of arrival (TDOA).

8. The mobile device of claim 5, wherein one or more of the radio measurement module, the memory, and the computing engine are implemented in a server in the wireless network.

9. The mobile device of claim 5, wherein the computing engine determines a plurality of system biases for the respective plurality of virtual base stations.

10. A system for determining a location of a mobile device in a wireless network including a plurality of network references comprising:
   means for providing a plurality of different locations for the mobile device using a location determining system;
   means for determining a plurality of estimated locations for a respective plurality of virtual base stations utilizing the plurality of provided locations for the mobile device and without using the network references; and
   means for determining a new location for the mobile device utilizing the plurality of determined estimated locations of the virtual base stations without utilizing the location determining system external to the wireless network and without using the network references.

11. The system of claim 10, wherein the location determining system is one or more of the group consisting of Global Positioning System, Iridium, and Galileo.

12. The system of claim 10, wherein the means for determining a plurality of estimated locations utilizes time difference of arrival (TDOA).

13. A method for establishing network references for a first wireless location determining system having a plurality of base stations, each base station having a respective actual location, the method comprising:
   providing a plurality of different locations for a mobile device using a second wireless location determining system, external to the first wireless location determining system;
   measuring radio signals between the mobile device and the plurality of base stations of the first wireless location determining system;
   determining a plurality of estimated locations for a respective plurality of virtual base stations based on the provided locations of the mobile device and the measured radio signals; and
   utilizing the plurality of determined estimated locations of the plurality of virtual base stations for establishing the network references for the first wireless location determining system, without using the actual locations of the base stations.

14. The method of claim 13, wherein the second wireless location determining system is one or more of the group consisting of Global Positioning System, Iridium, and Galileo.

15. The method of claim 13, wherein the plurality of estimated locations for a respective plurality of virtual base stations are determined using time difference of arrival (TDOA) method.

16. The method of claim 13, further comprising determining a plurality of system biases for the respective plurality of virtual base stations.

17. A system for establishing network references for a first wireless location determining system having a plurality of base stations, each base station having a respective actual location, comprising:
   means for providing a plurality of different locations for a mobile device using a second wireless location determining system, external to the first wireless location determining system;
   means for measuring radio signals between the mobile device and the plurality of base stations of the first wireless location determining system;
   means for determining a plurality of estimated locations for a respective plurality of virtual base stations based on the provided locations of the mobile device and the measured radio signals; and
   means for utilizing the plurality of determined estimated locations of the plurality of virtual base stations for establishing the network references for the first wireless location determining system, without using the actual locations of the base stations.

18. The system of claim 17, further comprising means for determining a plurality of system biases for the respective plurality of virtual base stations.

19. The system of claim 17, wherein the second wireless location determining system is one or more of the group consisting of Global Positioning System, Iridium, and Galileo.

20. The system of claim 17, wherein the means for measuring radio signals utilizes time difference of arrival (TDOA).

* * * * *